United States Patent

[11] 3,605,080

| [72] | Inventor | Frank R. Abbott |
| | | San Diego, Calif. |
| [21] | Appl. No. | 887,202 |
| [22] | Filed | Dec. 22, 1969 |
| [45] | Patented | Sept. 14, 1971 |
| [73] | Assignee | The United States of America as represented by the Secretary of the Navy |

[54] ELECTRODYNAMIC SONAR PROJECTOR
10 Claims, 7 Drawing Figs.

[52] U.S. Cl. ................................................... 340/12, 310/30, 318/124
[51] Int. Cl. ................................................ H04b 11/00
[50] Field of Search ........................................... 340/8, 12; 318/124; 310/14, 15, 30

[56] References Cited
UNITED STATES PATENTS

| 3,517,379 | 6/1970 | Chervenak | 340/12 |
| 3,336,488 | 8/1967 | Scott | 318/124 X |
| 3,353,040 | 11/1967 | Abbott | 340/8 X |
| 1,991,952 | 2/1935 | Murphy | 318/124 |

*Primary Examiner*—Richard A. Farley
*Assistant Examiner*—Brian L. Ribando
*Attorneys*—Richard S. Sciascia, Ervin F. Johnston and Thomas G. Keough

ABSTRACT: A compact, high-power, electromechanical transducer having a reduced inertia for efficient, low frequency transmission of sonar energy is provided, and includes a pair of coaxially disposed, cylindrically shaped members operatively connected to an outwardly facing projecting piston. DC conductors are mounted between radially inwardly projecting, helically configured ribs on the outer member and alternate with control current conductors, similarly disposed adjacent the radially inwardly projecting ribs, to electromechanically cooperate for attracting and repelling radially outwardly extending ridges carried on the inner cylindrical member and reciprocably displace the piston in accordance with the impressed alternating control frequency. Locating all the conductors on the outer stator shell member and constructing the inner armature member of a lightweight fiber glass material mounting small radially outwardly projecting ridge portions, provide a transducer having a minimal inertial resistance to bidirectional excursions ensuring an efficient distortion free transmittal of acoustic energy.

INVENTOR.
FRANK R. ABBOTT
BY
THOMAS G. KEOUGH
ERVIN F. JOHNSTON
ATTORNEYS

{ 3,605,080 }

ELECTRODYNAMIC SONAR PROJECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Compact projection transducers having a pistonlike radiating surface driven by an electromechanical driving arrangement all suffer limitations when high level acoustic energy is to be transmitted. In particular, when low frequency operation calls for driving power in hundreds of watts or kilowatts, the piston amplitude reciprocably traverses distances in excess of a quarter of an inch. Since high-power, low-frequency acoustic energy transmission depends almost entirely on employing electromagnetic transducers, the mass of windings and magnetic cores introduce a high inertial impedance to bidirectional excursions of the radiating piston. This inherent limitation has heretofore confronted designers especially where the diameter of the piston is a small fraction of the transmitted acoustic signal's wavelength.

SUMMARY OF THE INVENTION

The present invention is directed to providing a compact, low inertia, electromechanical transducer for projecting acoustic energy from an outwardly facing piston member. A lightweight movable armature shell, carrying a plurality of helically extending magnetizable ridges is joined to the piston member and is coaxially disposed within a stator shell. A plurality of helically extending magnetizable ribs, secured to the inner surface of the stator shell, is oriented in a contiguously adjacent relationship to the ridges. A stator conductor, passing DC current, longitudinally extends through stator channels formed between adjacent ones of the ribs and, similarly, AC control conductors longitudinally extend through separate control channels formed between adjacent ones of said ribs. An AC control current is passed through the control conductors alternately polarizing particular ones of said ribs for axially attracting and repelling the ridges to effect a distortion free transmission by reason of having the electrical conductors carried solely on the stator and by additionally providing a lightweight fiber glasslike shell material for the armature shell.

Therefore, it is a prime object of the instant invention to provide an electromechanical transducer having an improved signal transmission capability.

Yet another object is to provide an electromechanical transducer inherently possessing a reduced inertia transmitting train.

A further object of the invention is to provide an electromechanical transducer of higher efficiency in the low acoustic range.

Still another object of the invention is to provide an electromechanical transducer capable of exerting a transmitting force of several thousand pounds while being reasonably compact.

These and other objects of the invention will become readily apparent from a reading of the ensuing description when taken with the drawings.

DESCRIPTION OF THE PREFERRED EMBODIMENTS

Figures 1, 1A, 4:
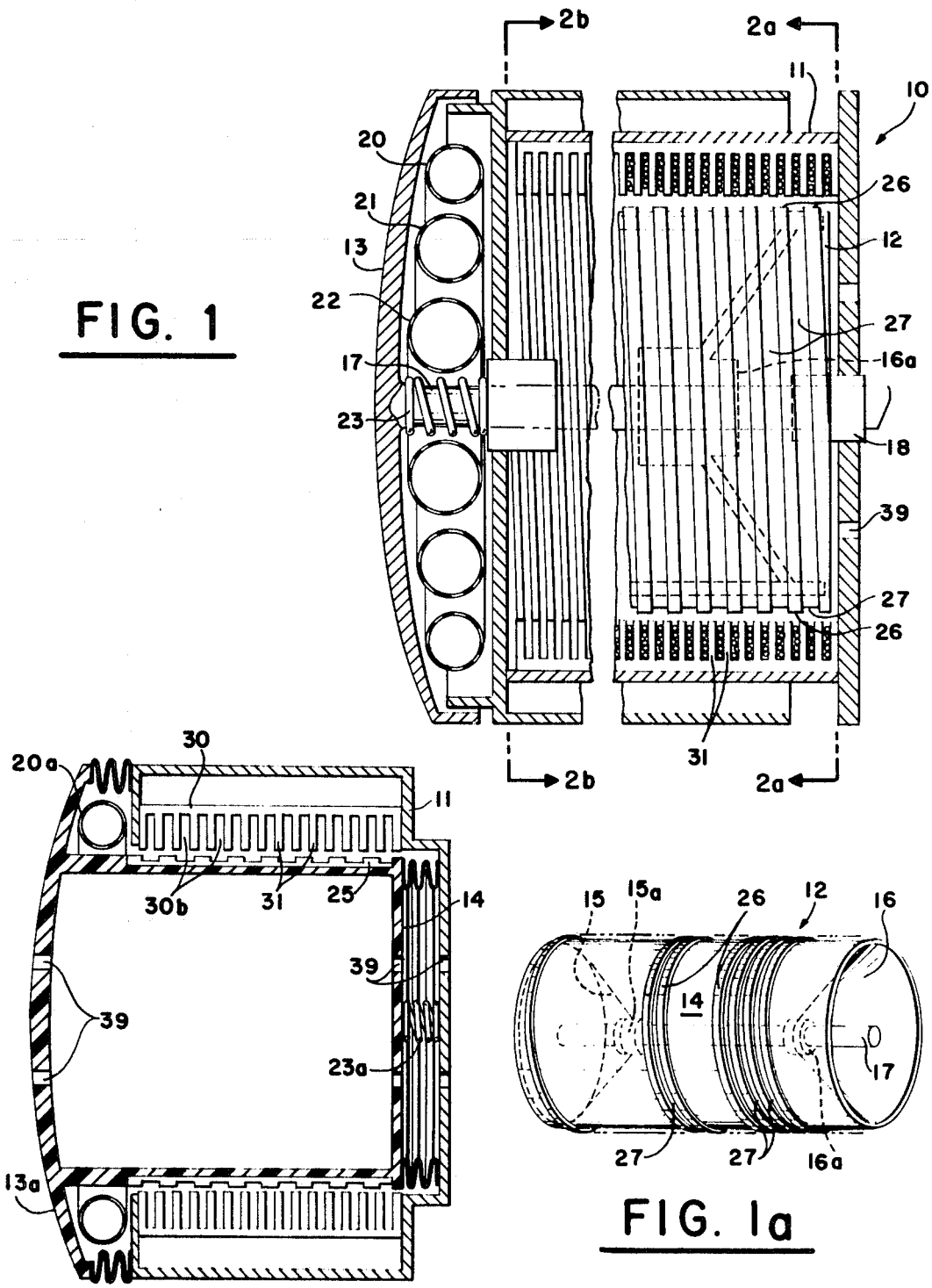
FIG. 1 sets forth a partial sectional view of the invention.
FIG. 1a is an isometric depiction of the reciprocal, displaceable armature.
FIG. 4 is a cross-sectional side view of another embodiment of the invention.

Referring now to the drawings, the improved electrodynamic sonar projector 10 employs an electromechanical reaction between an outer stator cylinder 11 and an inner reciprocably displaceable armature cylinder 12 mechanically joined to an essentially, disk-shaped radiating piston 13. Electromechanical transducers are used in preference to transducers employing piezoelectric elements as the driving elements where exceptionally low-frequency acoustic energy is projected, for example, in the 10 to 100 Hz range, at high projection powers of hundreds of watts or kilowatts. Also, in the case of the instant invention, where the diameter of the radiating piston is a small fraction of the transmitted energy wavelength, amplitudes of reciprocal piston displacement exceeding one-fourth of an inch require an electromechanical device. Obviously, axially displacing the inner armature cylinder and the connected radiating piston to project substantially distortion-free acoustic energy, calls for their having a minumum mass to ensure quick recovery from extreme, opposite reciprocal excursions.

Therefore, it is with this prime design objective that transducer performance has been enhanced by lowering the mass of the moving elements. Providing a lightweight, yet strong, cylindrically shaped fiber glass shell 14 helps achieve this goal. At its opposite ends, the shell is formed with load and force resistant conically concave surfaces 15 and 16 each terminating in an axially disposed sleeve portion 15a or 16a that are either bonded, clamped, or otherwise secured to a longitudinal pushrod 17. The pushrod is carried in a slidable relationship to the outer stator cylinder by a pair of sleeved, slide bearings 18 and 19 having, optionally, internal seals permitting an axial, reciprocal vibration of shell 14 and piston 13 in accordance with an impressed driving signal in a manner which will be set out below.

Recovery from opposite axial reciprocations and proper longitudinal positioning of the armature is provided by a plurality of essentially toroidal-shaped tubes 20, 21, and 22 coaxially disposed about the longitudinal pushrod adjacent the inner surface of the radiating piston. When the transducer is operated at the great depths, an automatic pressure compensating source, well known within the state of the art, is connected to the tubes to offer the required amount of counteracting force to the surrounding water pressure. Rapid recovery from bidirectional excursions of the armature and piston is augmented by including a relatively stiff, helical spring 23 anchored to the radiating piston and the outer surface of the outer stator cylinder to place the piston at a "-neutral" position when alternating control signals cease to be fed to the transducer.

Low inertia in the moving, driving elements is more completely provided by securely mounting, by bonding or clamping a plurality of radially disposed, tooth-shaped laminations 25 on the outer surface of fiber glass shell 14. The laminations are stamped from thin strips of high permeability material configured with toothlike projections 25a. The laminations are arranged in a side-by-side relationship, in keeping with the proven method of AC and DC power machinery construction for reducing eddy current losses, and, optionally, have a wedge-shaped cross-sectional area to permit a cylinder-configured side-by-side fitting, although insulated wedges can be used between adjacent laminations to cylindrically shape them. Individual ones of the tooth-shaped laminations are substantially identical to each other but are slightly shifted longitudinally on the fiber glass shell to define helically shaped ridges 26 separated by identically configured helically extending voids 27. The helical ridges and voids are orientated in a desired lead, the longitudinal distance on the cylinder within which one complete revolution of the helical ridges or voids is formed, by selectively displacing adjacent ones of the tooth-shaped laminations the proper incremental amount.

Figure 2A:
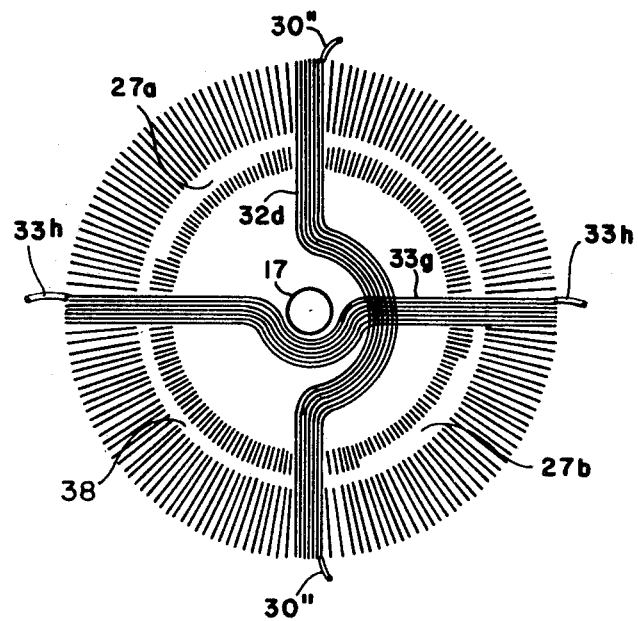
FIGS. 2a and 2b are schematic sectional views taken along lines 2a—2a and 2b—2b in FIG. 1.
Figure 2B:
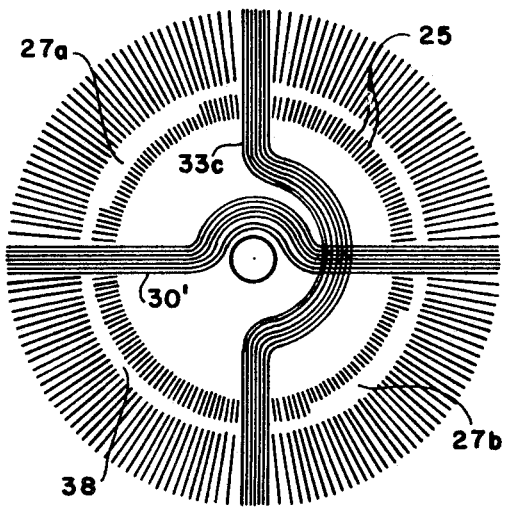

In the representative embodiment, the laminations are displaced to form two voids 27a and 27b, noting FIGS. 2a and 2b, to analogize the shifted tooth-shaped laminations to a multiple-threaded bolt having two separate threads.

In a similar manner, stator tooth-shaped laminations 30 are shaped and arranged to form helically disposed, inwardly extending ribs 31 separated by contiguously, adjacent helically configured channels. With respect to the ridges 25a carried on the armature cylinder, the helically shaped ribs define a pitch one-half that of the ridges while possessing an identical lead. Thus, applying an analogy between a multithreaded nut to the helically extending ribs and channels, the stator tooth-shaped laminations are said to define four threads, that is four discrete ribs and four discrete channels.

The prime advantage of the instant invention, providing a minimal mass armature having a low inertial, is achieved by placing a continuous insulated DC conductor 32, helically extending in a first DC channel, the entire length of the stator laminations. At the outward end of the stator laminations, noting FIG. 2b, the DC stator winding is crossed, over at portion 30' to return to the opposite end of the stator cylinder in a second, alternate DC channel. This winding process is continued until both the first and second channels are completely filled with the DC stator winding and reach to a remote source of DC power via leads 30".

Similarly, an insulated AC control winding 33 runs continuously in one of the alternate "unfilled" channels, crosses at the outward end of the stator laminations at portion 33c and returns in the remaining channel. Continued winding of the AC winding fills the AC channels and the winding terminates, at opposite ends, in remotely extending leads 33h. The AC and DC conductors alternate in the four adjacent channels as depicted in FIGS. 3a and 3b.

Figure 3A:
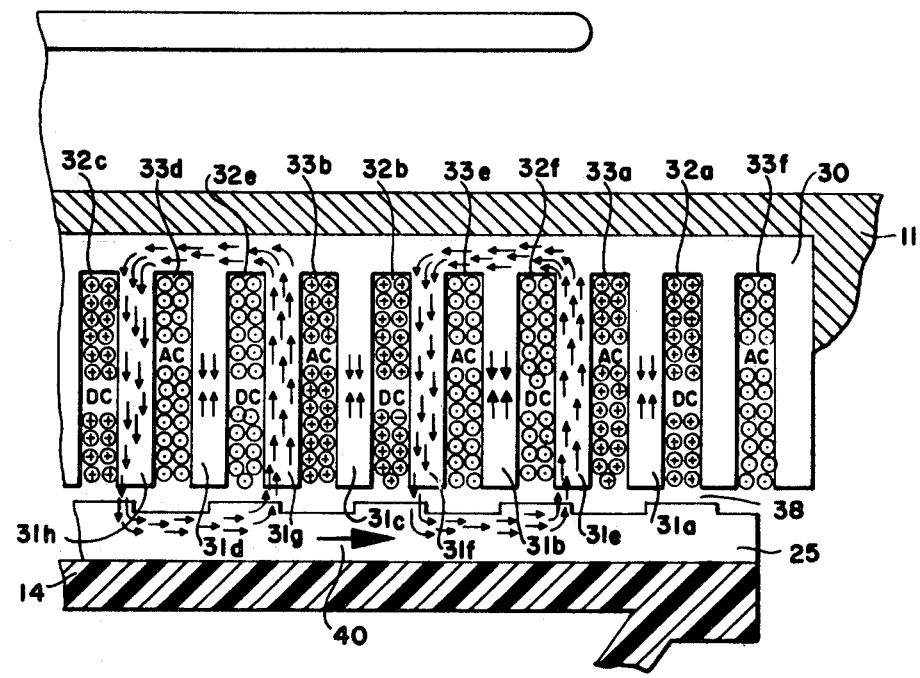
FIGS. 3a and 3b are sectional representations of the armature and stator cylinders showing the electromechanical interaction.
Figure 3B:
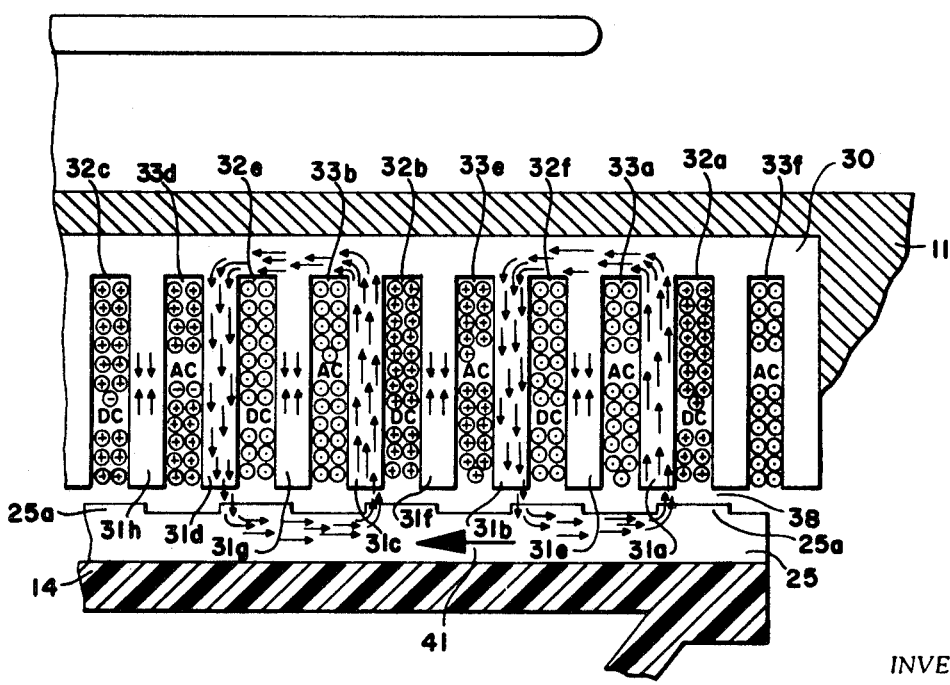

Having the conductors so disposed on the stator shell only, permits polarization of selective ones of the inwardly extending ribs and their resultant electromechanical reaction with the ridges to cause reciprocal displacement of the radiating piston, as schematically represented in FIGS. 3a and 3b.

The helically continuously extending DC winding 32 has current passing into the paper at portions generally designated by the reference characters 32a, 32b, and 32c. As the continuously extending conductor crosses the ends of the outer stator cylinder and the inner armature cylinder at portion 32d, the return DC winding has the current flow direction indicated as coming out of the paper at portions 32e and 32f.

In a similar manner, a selective instantaneous polarity of the AC signal shown in FIG. 3a has portions 33a and 33b of the AC conductor, passing current into the paper and, after crossing the ends of the stator cylinder and the armature cylinder at portion 33c, the AC current flow returns in the AC conductor at continuous portions 33d, 33e, and 33f; 33f eventually extends across inner ends of the transducer at a portion 33g to remotely located driving circuitry via leads 33h.

The DC current is formed from full-wave rectification of the AC component. Thus, simultaneous additive magnetic flux is induced in alternate ones of the inwardly extending ribs and complete, in-phase cancellation of magnetic flux is induced in alternate ones of the inwardly extending ribs.

In operation, noting FIG. 3a, when the instantaneous AC signal is as depicted, magnetic flux induced by the DC component and the AC component mutually cancels each other in alternate, inwardly extending ribs 31a, 31b, 31c, and 31d, and so on, along the entire length of the stator cylinder. On the other hand, the magnetic flux induced by the DC and the AC windings is additive through the other alternate, inwardly extending ribs 31e, 31f, 31g, and 31h, and so on, along the entire length of the stator. Because there is a tendency by the armature tooth-shaped laminations 25 to axially move to cover the alternate poles produced by the AC and DC signal interaction, the armature cylinder 12 is urged in a longitudinal motion to the right as indicated by arrow 40.

When the polarity on the AC control winding 33 is reversed, noting FIG. 3b, the AC and DC induced magnetic flux passing through inwardly extending ribs 31a, 31b, 31c, and 31d, and so on, along the stator cylinder, becomes additive and creates an active pole, whereas, the AC and DC induced magnetic flux passing through inwardly extending ribs 31e, 31f, 31g, and 31h opposes each other to cancel itself producing a dead pole. Since there is a tendency for the armature tooth-shaped laminations 25 to cover the active poles produced by the electromagnetic interaction, the inner armature cylinder 12 is urged in a longitudinal direction to the left as indicated by arrow 41.

As a matter of superior design, the depth of the channels formed between the inwardly extending ribs can be considerable to allow a great number of turns of both the AC or DC windings. A high number of turns plus high driving power produces a considerable amount of ampere turns and resultant high magnetic flux through the stator laminations. The bulk and weight of the armature laminations remain constant irrespective of the driving power passed through the AC and DC windings.

It should be pointed out that the schematic representations of the invention should not be construed as placing relative size and dimension restrictions. In particular, in an operational embodiment of the invention constructed to displace disk-shaped radiating piston 13 a reciprocal amplitude of one-half of an inch, the width of inwardly extending ribs 31 is one-fourth of one inch with a 1/4 inch channel between adjacent ribs; the height of the ridges 26 is 1/16 of an inch high with a 1/2 inch width and the lamination has a total height of less than one-eighth of an inch. Both the stator and the armature laminations had a thickness of 0.014 inch or less. The airgap between the ridges and the ribs, generally designated by the reference character 38, was 0.01 inch to achieve the desired flux paths.

Another embodiment shown in FIG. 4 further reduces the mass of an inner reciprocally displaceable armature cylinder 12a by eliminating the longitudinal pushrod and connecting the armature cylinder 12a directly to the disk-shaped radiating piston 13a. A pair of flexible metallic bellows joins the piston and the inner cylinder to the stator cylinder. Otherwise, the electromechanical interaction is substantially identical to the embodiment set forth in FIGS. 1 though 3. Improved operation is also taken into account by including a toroidal tube 20a and helical spring 23a. Flooding ports 39 are optionally provided in both embodiments to aid in cooling when prolonged periods of operation are demanded.

Although the disclosed invention calls for the stator cylinder being the outer cylinder and the armature cylinder being the concentrically, inwardly disposed cylinder, the outer cylinder is optionally converted to function as the armature cylinder and the inner armature cylinder is converted to form the stator function by simply rearranging interconnecting structure and the anchoring points.

Obviously, many modifications and variations of the present invention are possible in the light of the above teachings, and, it is therefore understood that within the scope of the disclosed inventive concept, the invention may be practiced otherwise than as specifically described.

What is claimed is:

1. An electromechanical transducer having a reduced inertia comprising:
    an outwardly facing piston member;
    an armature shell connected to said piston member for imparting reciprocal motion representative of an alternating control current thereto, having a plurality of juxtaposed, helically extending magnetizable ridges carried on its surface; and
    a stator shell coaxially disposed with respect to said armature shell including,
    means for carrying said armature shell to ensure said reciprocal motion, a plurality of juxtaposed, helically extending magnetizable ribs secured to said stator shell oriented contiguously adjacent said ridges, stator conductors longitudinally disposed in stator channels formed between adjacent pairs of said ribs passing a DC current therethrough, and control conductors longitudinally disposed in control channels formed between adjacent pairs of said ribs passing alternating control current therethrough, said DC current and said alternating control current electromechanically cooperating to alternately polarize particular ones of said ribs for axially attracting and repelling said ridges to effect said reciprocal motion.

2. A transducer according to claim 1 in which said armature shell is a lightweight fiber glass shell to minimize inertial impedance to said reciprocal motion.

3. A transducer according to claim 2 in which said stator channels and said control channels alternate with each other along the longitudinal axis of said transducer.

4. A transducer according to claim 2 in which said ridges have the same lead as, and twice the pitch of said ribs.

5. A transducer according to claim 4 further including: detent means for returning said piston to a normal position to ensure higher operating frequencies.

6. A transducer according to claim 1 in which said armature shell is coaxially telescoped within said stator shell with said ridges projecting radially outwardly and said ribs projecting radially inwardly.

7. A transducer according to claim 6 further including:
means for flooding said armature shell for cooling said transducer.

8. A transducer according to claim 2 in which said ridges are in the order of magnitude of one-fourth the length of said ribs to further minimize said inertial resistance.

9. A transducer according to claim 8 in which a separate said ridge spans a distance equal to one rib and one channel.

10. A transducer according to claim 1 in which said ribs and said ridges are formed from a plurality of elongate comb-shaped laminations radially arranged in a side-by-side relationship to form said helically extending magnetizable ribs and said helically extending magnetizable ridges to minimize eddy current losses.